United States Patent

Kanerva et al.

Patent Number: 6,122,649
Date of Patent: *Sep. 19, 2000

[54] METHOD AND SYSTEM FOR USER DEFINED AND LINKED PROPERTIES

[75] Inventors: Heikki J. Kanerva, Redmond; Martin Thorsen, Kirkland; Brian D. Wentz, Bellevue, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/656,427

[22] Filed: May 30, 1996

[51] Int. Cl.[7] .................................................. G06F 17/21
[52] U.S. Cl. ............................................................. 707/516
[58] Field of Search ..................................... 707/515, 103, 707/516, 522, 523, 530; 345/335

[56] References Cited

U.S. PATENT DOCUMENTS

| | | | |
|---|---|---|---|
| 5,666,553 | 9/1997 | Crozier | 707/540 |
| 5,680,616 | 10/1997 | Williams et al. | 707/103 |
| 5,752,027 | 5/1998 | Familiar | 707/103 |
| 5,754,175 | 5/1998 | Koppolu et al. | 345/335 |
| 5,778,227 | 7/1998 | Jordan | 395/682 |

OTHER PUBLICATIONS

OpenDoc Technical Summary, Version 1.0, Apple Computer, Inc., pp. 1–54, Jan. 1994.
"Notes Help Release 3 (help.nsf)," *Lotus Notes 3.34*, Chapter 5, Jan. 27, 1995.
"Appendix B—Ole Property Sets," *Ole 2 Programmer's Reference, VI—Working Windows® Objects*, Microsoft Press, 1994, pp. 857–879.

*Primary Examiner*—Joseph H. Feild
*Attorney, Agent, or Firm*—Jones & Askew, LLP

[57] ABSTRACT

A computer system for creating a user-defined property for a document and for linking properties to content of the document. When the document is open, a first application receives from a user a name, a type, and a value of property to be created, creates a property within the properties area of the document by storing the name and type of the property within the properties area, and stores the value within the properties area. When the document is closed, a second application retrieves the name, type, and value of the created property from the properties area, and displays the name and the value of the created property. To link the property to the content, the first application receives from a user an indication that the property is to be linked to a field within the content of the document, retrieves the value of the field from within the content of the document, and stores the retrieved value and type as the value of the property. The second application then changes the stored value of the property when the document is closed. The first application detects that the stored value of the property is different from the value of the field within the content the document, and sets the value of the field within the content of the document to the value of the property.

12 Claims, 14 Drawing Sheets

FIG. 4

METHOD AND SYSTEM FOR USER DEFINED AND LINKED PROPERTIES

TECHNICAL FIELD

The present invention relates generally to computer systems for managing of properties of a document and, more specifically, to a method and system for defining properties of the document and linking properties to content of the document.

BACKGROUND OF THE INVENTION

Oftentimes, software programs allow the sharing of state information (i.e., properties) of a document with other programs that are unable to access the content of the document. For example, word processing programs commonly maintain summary information regarding the documents they create and manage. The document summary information might include information such as the name of the document, its author, some key words used within the document, and time-related information such as the date and time the document was created and the date and time the document was last modified. If another program desires to display such properties for the documents created by the word processing program, then a prearranged agreement as to how the properties are to be stored and accessed by the programs needs to be established.

OLE property set model developed by Microsoft Corporation provides a model for the storing and accessing of properties of a document. The OLE property set model uses the structure storage model also developed by Microsoft Corporation. The structured storage model, known as compound files, allows the data within a file to be hierarchically structured into storage and stream objects. A storage object is a directory-like object that can contain stream objects and other storage objects. Each OLE property set is stored within a specific stream within the same file that contains the content of the document. In this way, any program that conforms to the structured storage model can locate the stream that contains the property set and access the properties.

An OLE property set is stored in a stream in a pre-defined organization so that once a program locates the property stream, the program can access the definitions of the properties. FIG. 1 illustrates the layout of the property set within the stream. The data stream 101 comprises a header 102, a section locator array 103, and one or more sections 104. The header contains information relating to the identification of the property set and the number of sections within the property set. Each section entry contains a format identifier that uniquely identifies the section and an offset that indicates the start of the section within the stream. The section locator array contains a section entry for each section of the property set. Each section in turn comprises three subsections: a section header 106, a property locator array 107, and a section type/value array 108. The section header contains a section size (i.e., number of bytes within the section) and a count of number properties within the section. The property locator array contains an entry for each property within the section. Each entry in the property locator array comprises a pair of values: a property identifier and an offset. The property identifier uniquely identifies the property within the section. The offset indicates the offset from the start of the section to the start of the property within the section type/value array. An entry of the section type/value array contains the type (e.g., date) of the property along with the value (e.g., May 1, 1996) of the property. Thus, to access a certain property with a certain format identification and a certain property identifier, a program would search the section locator array for an entry with a matching format identifier. The program would then use the offset within the entry to locate the section that contains the property. The program then searches the property locator array for an entry matching the property identifier. The offset within that entry indicates where the property data is stored within the stream.

Each program that uses a property needs to know not only its format and property identifiers, but also its meaning. For example, a browser program that displays the properties of a document would need to know the meaning of the property so that a meaningful label could be displayed when the property is displayed. Some format identifiers and property identifiers of properties (i.e., base properties) are pre-defined so that every program is assumed to know their meaning. Consequently, when the browser is developed, it can be programmed to automatically insert the correct label for base properties.

The OLE property set model, however, also allows non-base properties to be added after the browser is developed. However, if such a property is defined after the browser is developed, then the browser would need some other way to determine the appropriate label. The OLE property set model provides such a way by reserving one property that can be used to store meaningful labels for the other properties within the section. The property with the property identifier of zero contains such a dictionary of meaningful names. The dictionary need only contain those labels for non-base properties and can omit entries of properties assumed to be universally known by client programs (i.e., base properties).

Developers of computer software can also extend the base set of property sets through the use of the dictionary. That is, a developer may define a new format identifier and a list of special purpose developer-defined properties. A generic browser would then be able to open up a property stream within a document and be able to display not only the base properties of which it is aware, but also can display the special purpose properties by using the meaningful names of the dictionaries.

Although the use of the property set model has facilitated the sharing of properties among programs, current usage of this model has some limitations. First, the only properties that a user can use are those in the base set or those special purpose properties that are defined by the developer of a program. Thus, a user cannot add properties that are tailored to the user's environment. For example, a user cannot add a property to a document that contains a patent application to indicate the date that the application was filed. Second, the properties do not reflect the content of the document. Thus, a generic browser would need to launch the application to have access to the content of the document itself. The launching of an application may place such an overhead that it would make the accessing of the content impractical or the user may not even have the application that can open the document in question. For example, the title of the patent application may be stored within the document. However, to access the title the processing program would need to be launched to access the title.

SUMMARY OF THE INVENTION

The present invention overcomes these limitations by providing a method and system for creating a user-defined property for a document. The document has a content area for storing the content of the document and a properties area for storing properties of the document. The property system receives from a user a name and a value of property to be created. In response, the property system creates a property within the properties area by storing the name of the property within the properties area. The property system then stores the value within the properties area so that the created property is a user-defined property of the document. In another aspect, the present invention provides a method and system for linking a property of a document to a field (i.e., a named entity within the document content). The property and the field each have an associated value. The property system receives from a user an indication that the property is to be linked to the field. The property system then stores within the properties area an indication that the property is linked to the field. The property system retrieves the value of the field and stores the retrieved value as the value of the property so that the field value can be accessed by accessing the property.

BRIEF DESCRIPTION OF THE DRAWINGS

FIG. 4 illustrates the automatic synchronization of the contents of the source field values with the linked property values when a document is first opened.

DETAILED DESCRIPTION OF THE INVENTION

Figure 1:
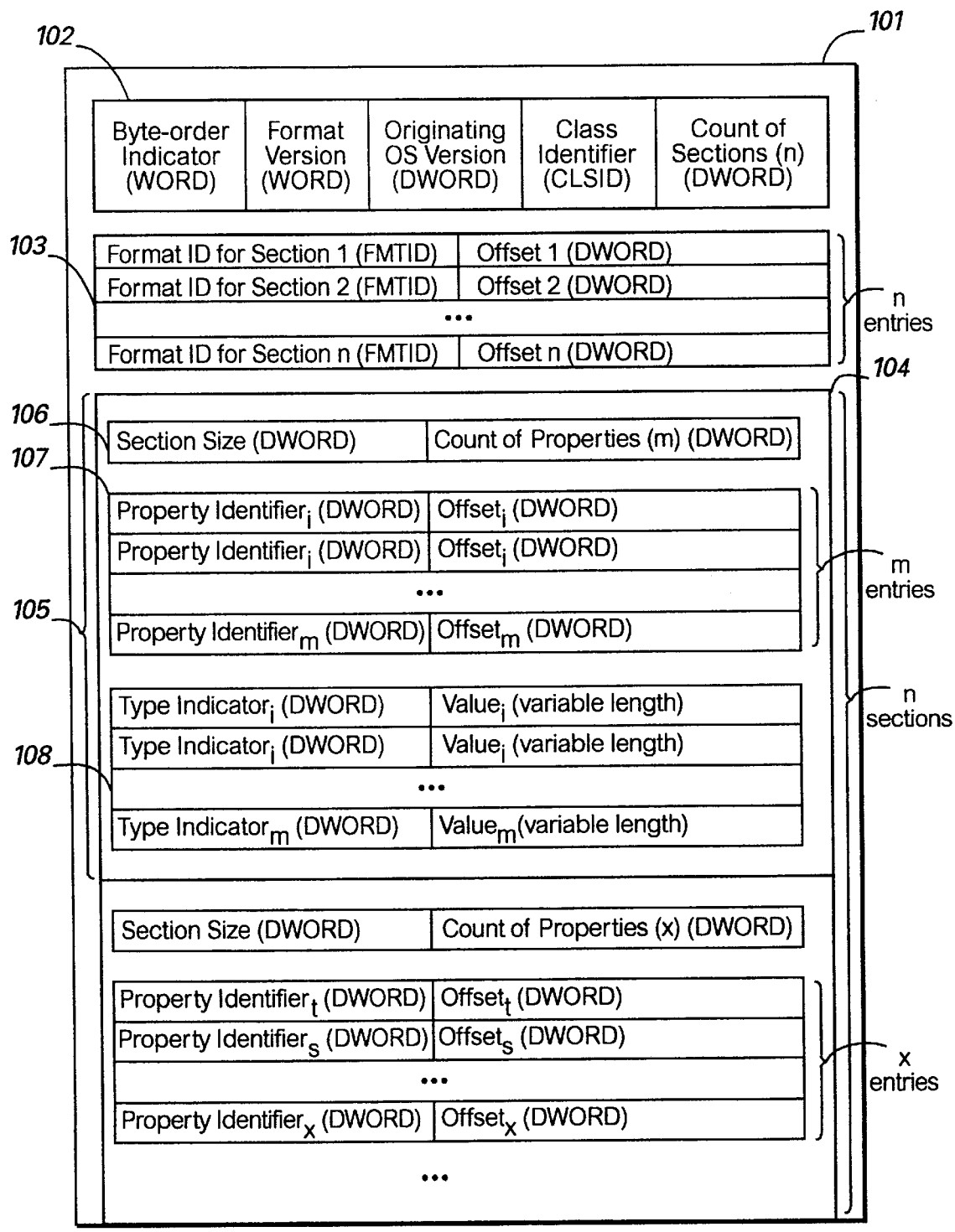
FIG. 1 illustrates the layout of the property set within the stream.

The present invention provides a property system for creating user-defined properties and for linking properties to the content of a document. In a preferred embodiment, the property system stores the properties of a document in the same structured storage area that contains the content of the document. The structured storage area preferably conforms to the OLE structured storage model, and the properties are stored within a stream of the structured storage area in conformance with the OLE property set model. However, one skilled in the art would appreciate that the present invention could be used in conjunction with other storage and property models.

To create a user-defined property for a document, the property system receives an indication of the name and the type of the property from a user. The property system then assigns a unique identifier for the property and stores the name and type in the property area for the document so that it is accessible given the unique identifier. In a preferred OLE property set model, the unique identifier is the property identifier, the name is stored in a dictionary property, and the type is stored in the type indicator. The dictionary contains a mapping of the name to the property identifier. The property system also allows a user to set and change the current value for a property in a manner that is similar to any other base property or developer-defined property. That is, the property system displays the name of the property along with the current property value, allows a user to enter a new property value, and then stores the new property value in the property area. Since the storing of the name, type, and property value are in conformance with the OLE property set model, other applications can access the user-defined property in a manner similar to the access of developer-defined properties.

To link a property to a portion (i.e., a source field) of the content of the document, the property system receives an identification of the portion and an identification of the property to be linked. The property system stores in the property storage area the identification of the portion to indicate that the linked property is linked to the portion. Since a linked property is stored in conformance with the OLE property set model, other applications can access the linked property. The linked property can be a base, developer-defined, or user-defined property. The linked property value contains the same value as the source field. Thus, a browser simply needs to access the linked property value to determine the source field value. A program that accesses the linked property can change its value and thus the linked property value and the source field value would not be synchronized. Similarly, the source field value can be changed when accessing the content of the document, and again the linked property value and the source field value would not be synchronized. The property system, however, synchronizes these values whenever the document is opened, closed, or saved, or when the property is displayed. When an application opens the document to access the content, the application checks for any linked properties. If a linked property value is different from its source field value, the application sets the source field value to the linked property value. When the application changes the source field value during editing of the content of the document, the application sets the linked property value to the changed value. This setting can be delayed until a user views the property value or until the document is closed. Through the use of linked properties, another application can effectively access the contents of the document without needing to know the native format of the content.

Figure 2A:
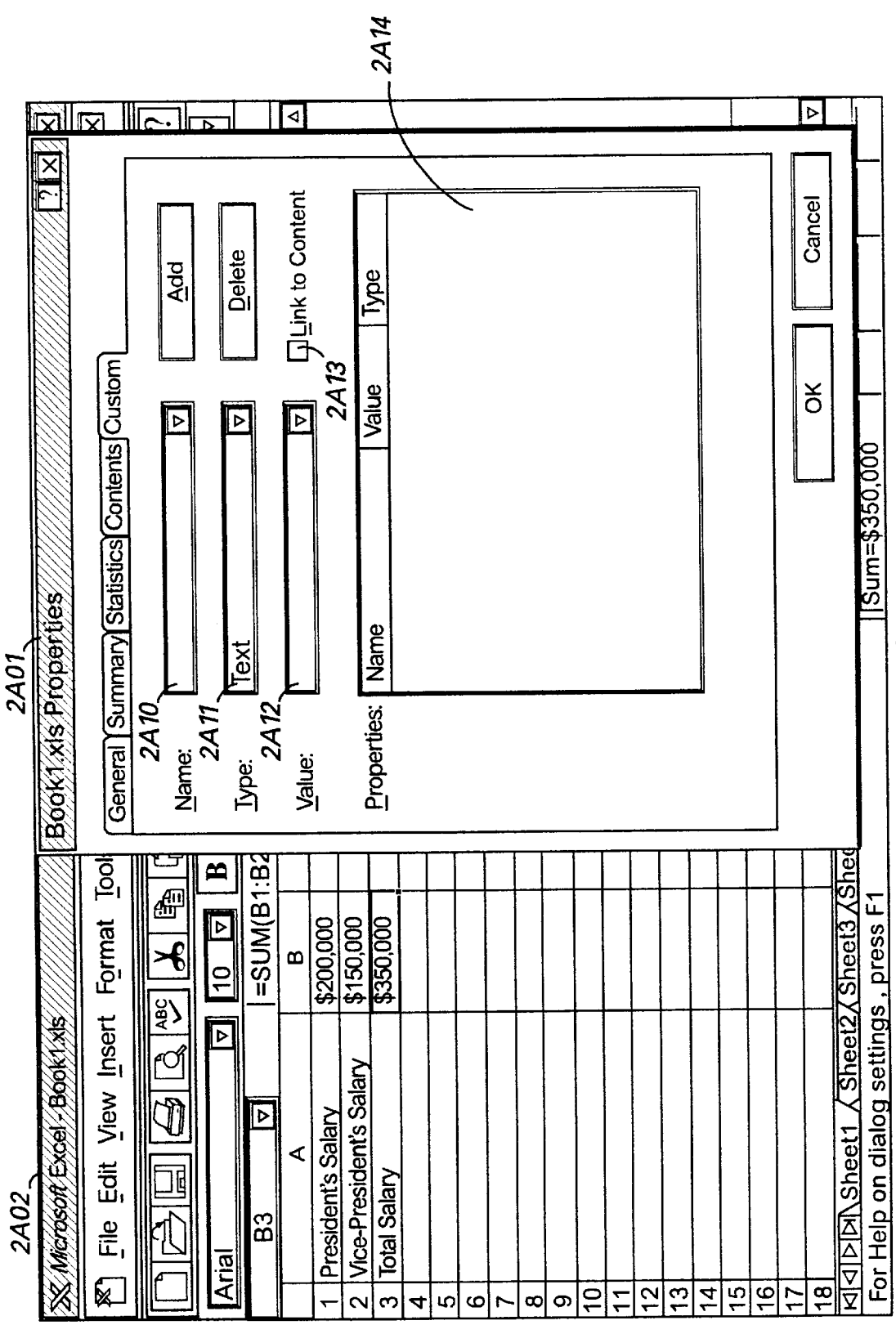
FIGS. 2A–2B are diagrams illustrating the user interface for the user-defined properties and linked properties
Figure 2B:
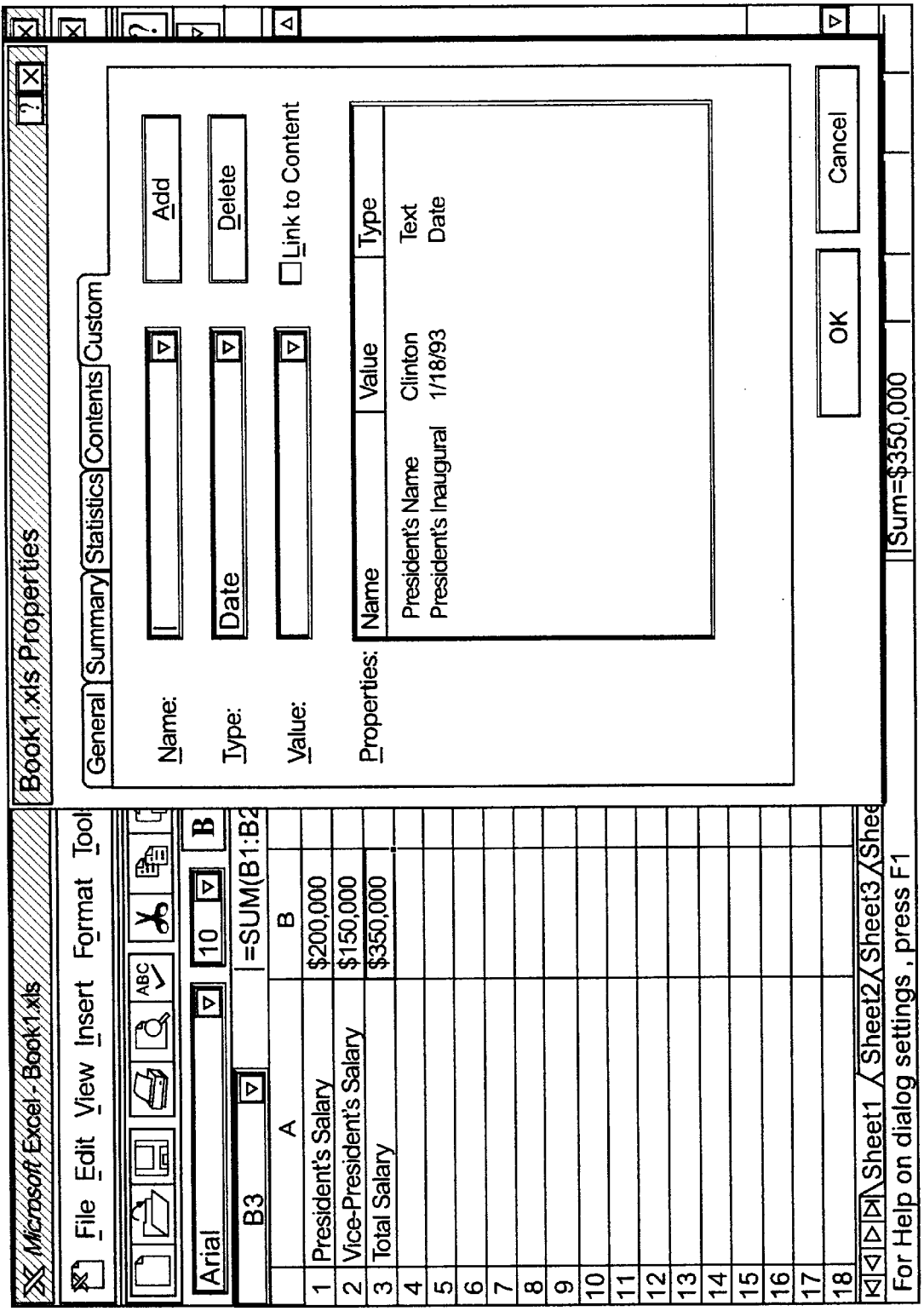

FIGS. 2A–2B are diagrams illustrating the user interface for the user-defined properties and linked properties. FIG. 2A shows a user interface that allows a user to define properties (i.e., "custom properties"). In a preferred embodiment, the custom properties user interface 2A01 is provided by an application program that accesses the content of the document. In this example, the application is a spreadsheet program that currently has the document entitled "Book 1.xls" opened. A user selects the properties menu item and the custom properties user interface 2A01 overlays the application user interface 2A02. The custom properties user interface contains a name box 2A10, a type box 2A11, a value box 2A12, and a link-to-content box 2A13. The custom properties user interface also contains a properties box area 2A14 for displaying the user-defined properties. The custom properties user interface also contains various buttons, such as, add and delete. To define a new property, the user enters the name of the property in the name box, enters the type of the property in the type box, and a value for the property in the value box and then selects the add button. The user-defined property is then displayed in the properties area. FIG. 2B shows the custom properties user interface with user-defined properties displayed. The properties area indicates that the user defined a property named "President's Name" with a type of text and with a value of "Clinton" and another property named "President's Inaugural" with a type of date and with a value of "Jan. 18, 1993."

Figure 3A:
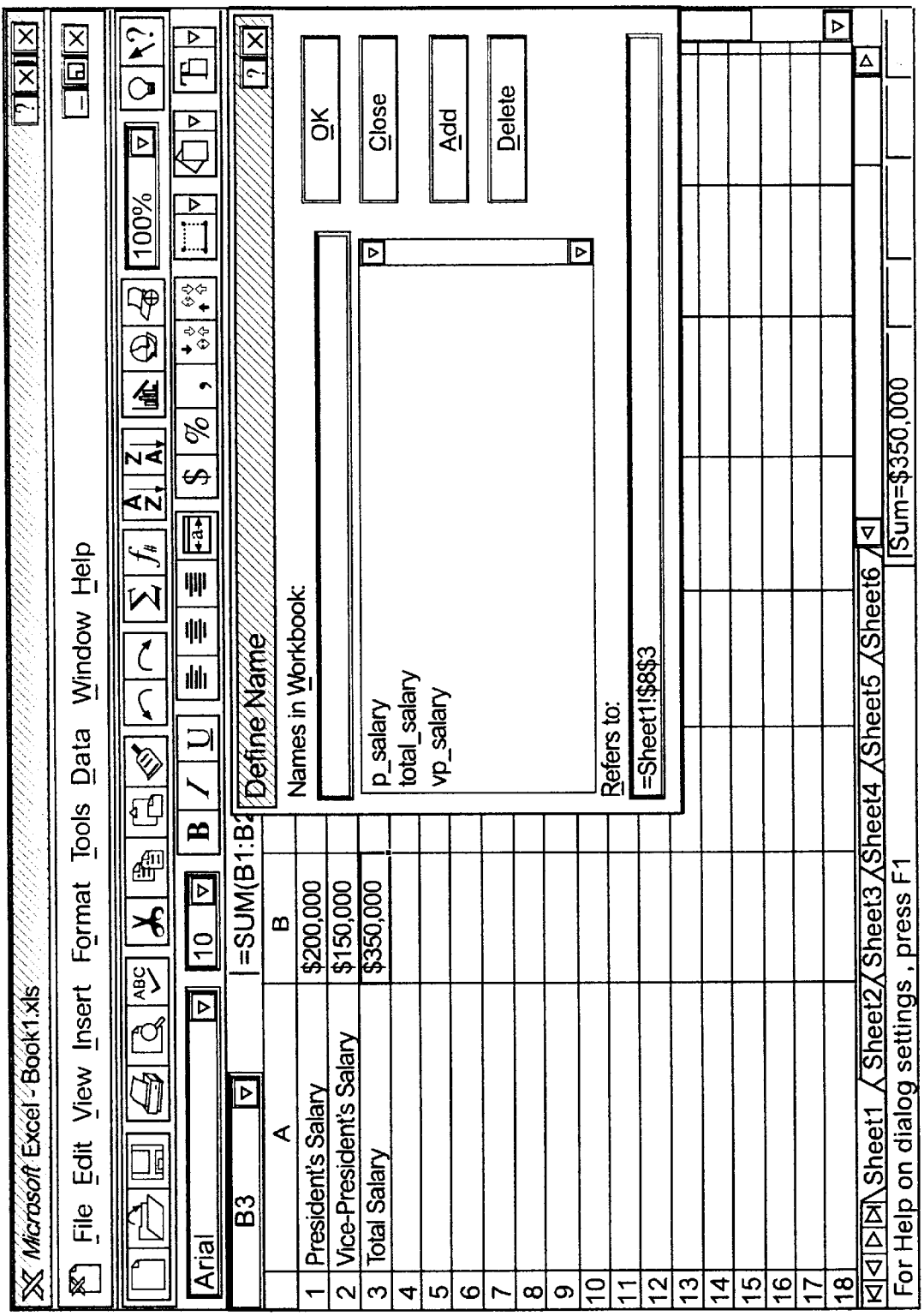
FIGS. 3A–3D illustrate the creating of a linked property.
Figure 3B:
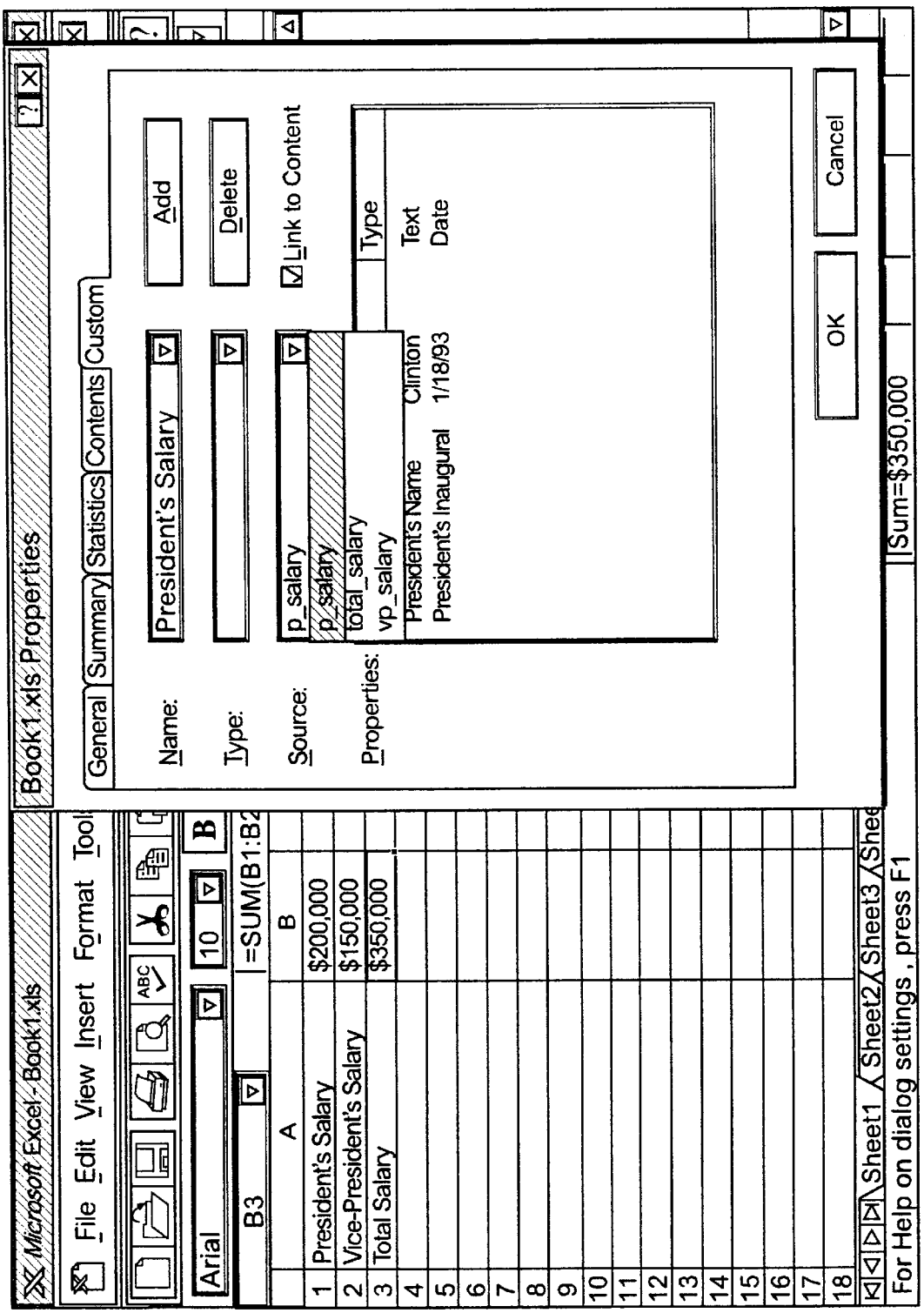
Figure 3C:
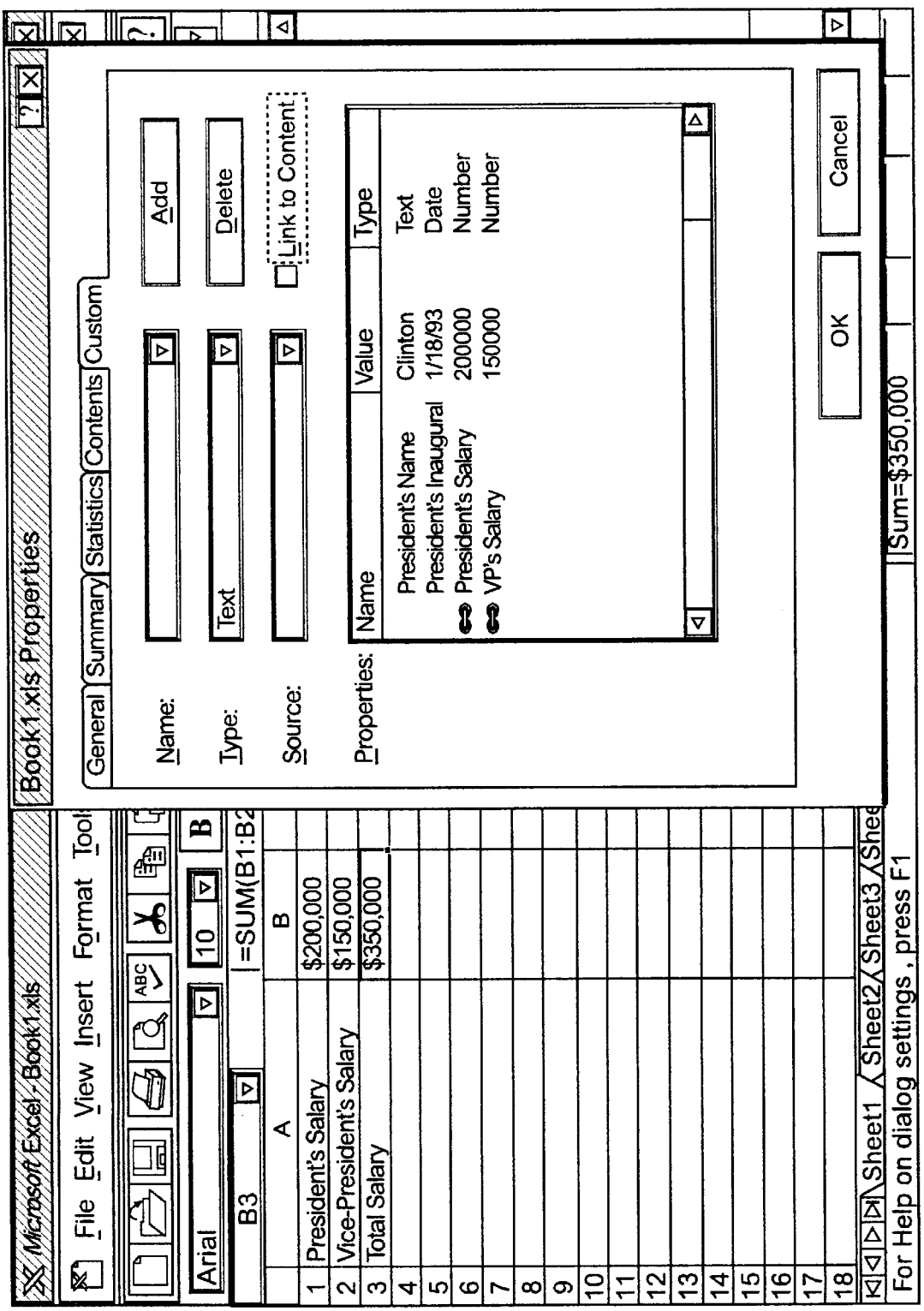
Figure 3D:
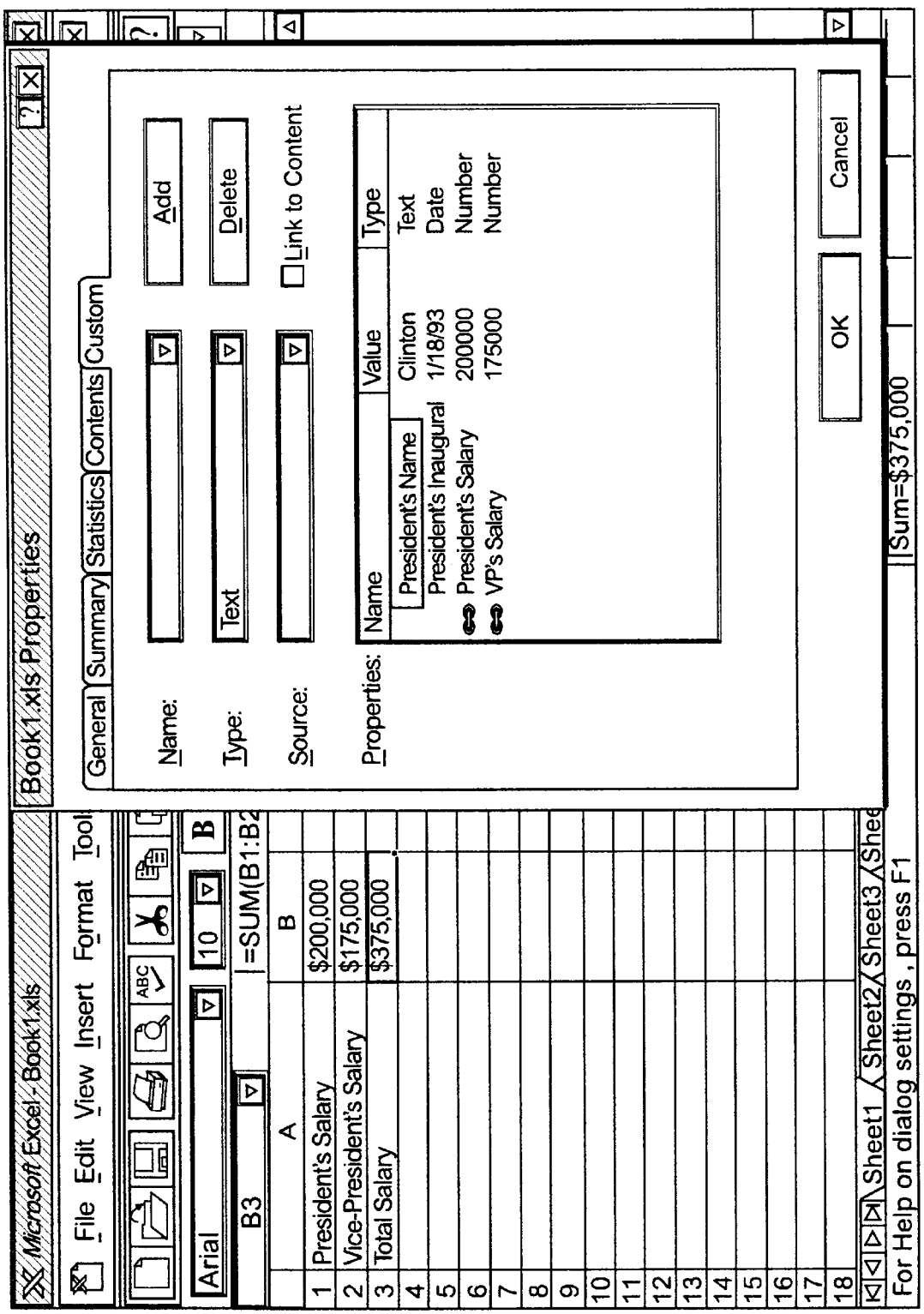

FIGS. 3A–3D illustrate the creating of a linked property. FIG. 3A shows various range names that are defined for the spreadsheet. In this example, cell B1 is given the range name "p_salary," cell B2 is given the range name "vp_salary," and cell B3 is given the range name "total_salary." It is typical for applications to allow a user to provide a name for certain portions (i.e., fields) of a document. For example, spreadsheet applications allow users to name a range of cells, and word processing applications allow users to name a bookmark that defines a portion of the text. Some applications also have predefined names for portions of the document. For example, a spreadsheet application uses a row and column identifier to name a cell. FIG. 3B illustrates the creation of a user-defined property that is linked to a range. In this example, the name of the property is "President's Salary," and it is linked to the range named "p_salary." To indicate that this user-defined property is to be linked, the user checks the link-to-content box. When the link-to-content box is checked, the source box replaces the value box. The source box is a list box through which a user can display the named contents of the document and select a named content as the source field. FIG. 3C shows the custom properties user interface with four user-defined properties. Two of the properties are linked to content of the spreadsheet. The linked properties are indicated by a chain link to the left of the property name. FIG. 3D illustrates that a user changed the vice president's salary from $150,000 to $175,000 by changing the value in the cell B2 of the spreadsheet. The next time the custom property user interface was displayed, it contained the new value for the vice president's salary. When a source field value is changed, the application updates the linked property value.

Figure 4:
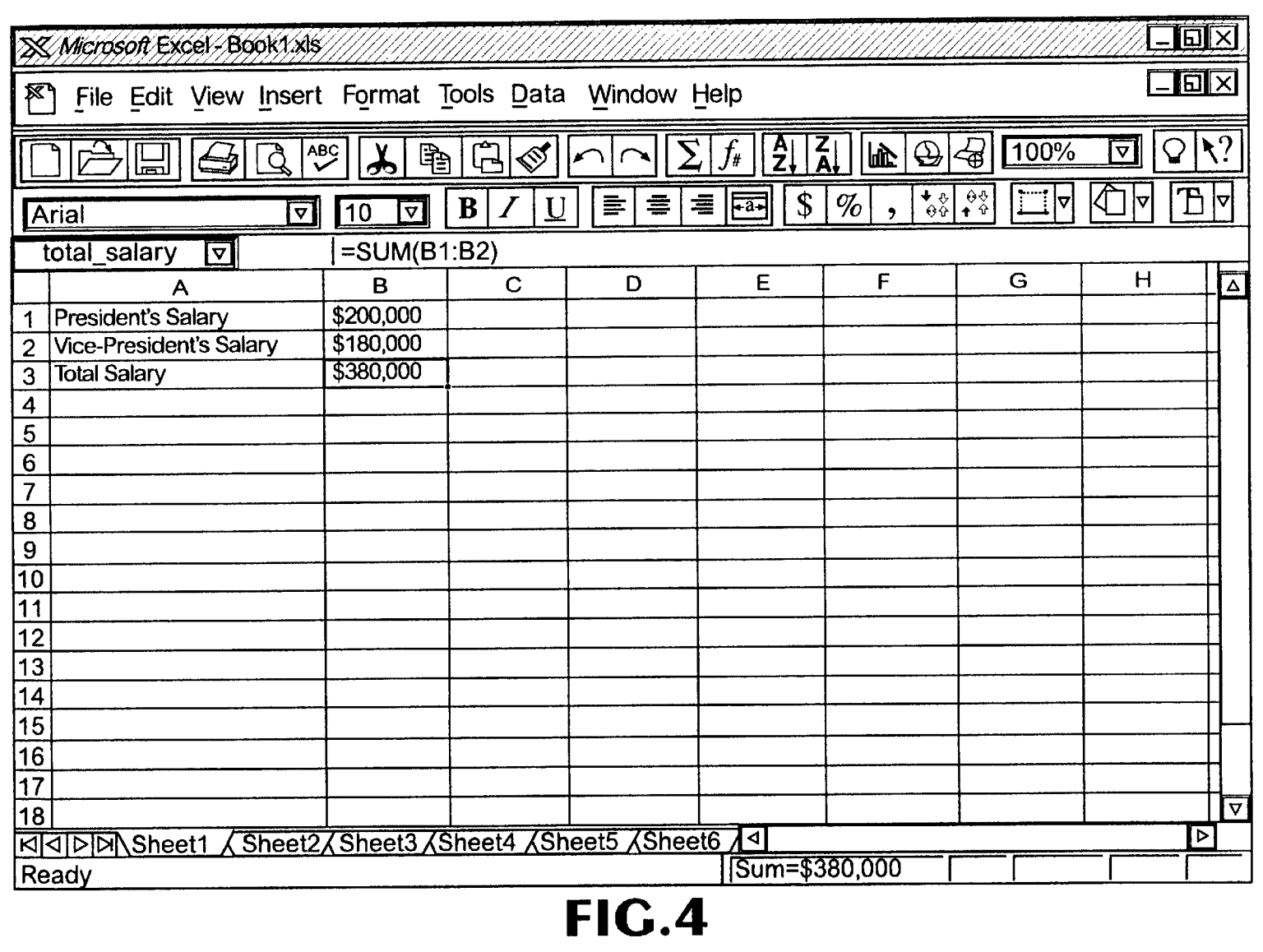

FIG. 4 illustrates the automatic synchronization of the contents of the source field values with the linked property values when a document is first opened. If when the document is closed, the property named "VP's Salary" is changed to $180,000, the content of the spreadsheet is not updated at that time. However, when the spreadsheet is next opened, before the content of the fields are displayed, the spreadsheet program checks the properties to see if any linked property values have been changed. If the linked property values have been changed, then the corresponding source field values are updated as indicated by the value of $180,000 in cell B2.

Figure 5A:
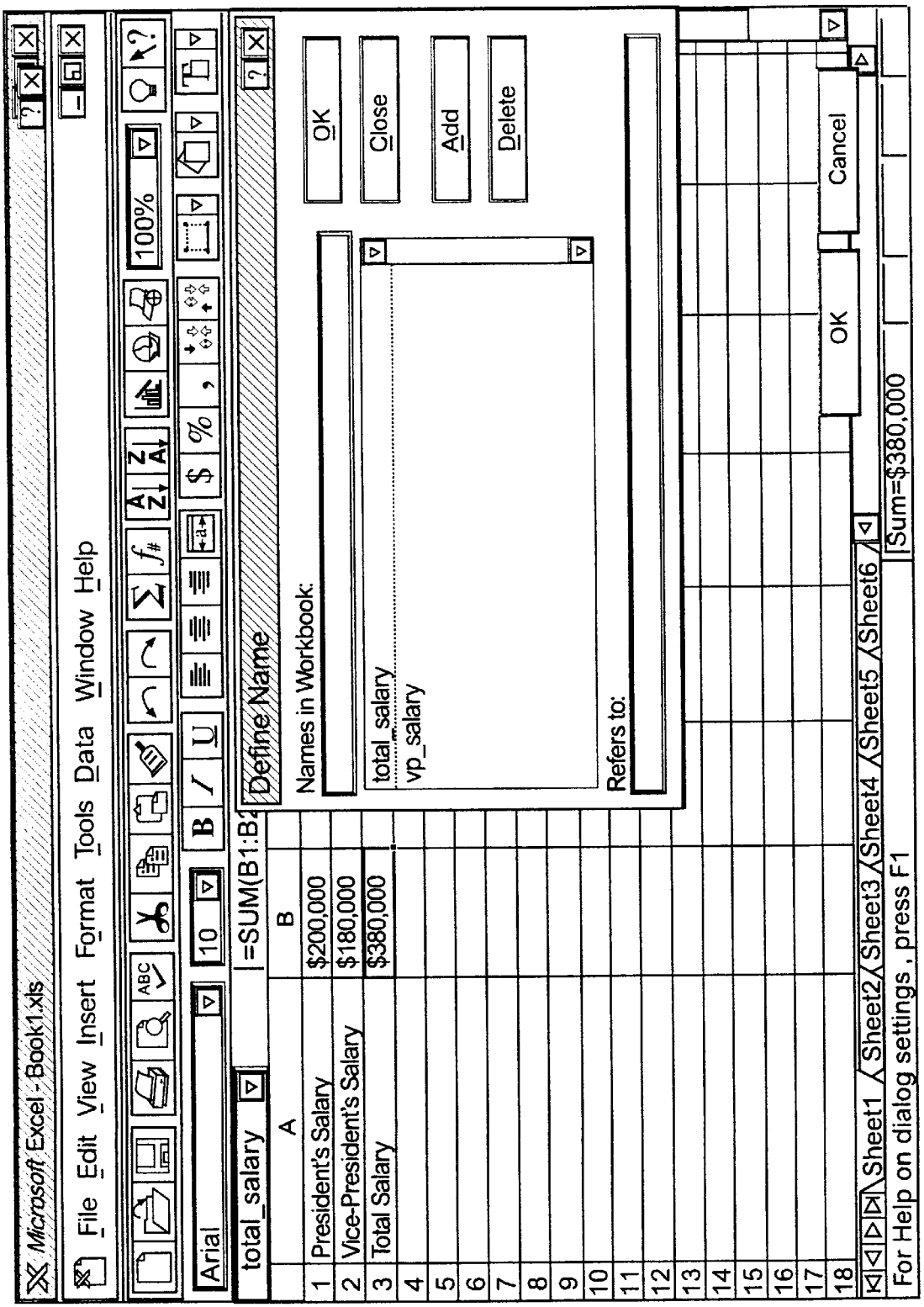
FIGS. 5A and 5B illustrate the breaking of a link.
Figure 5B:
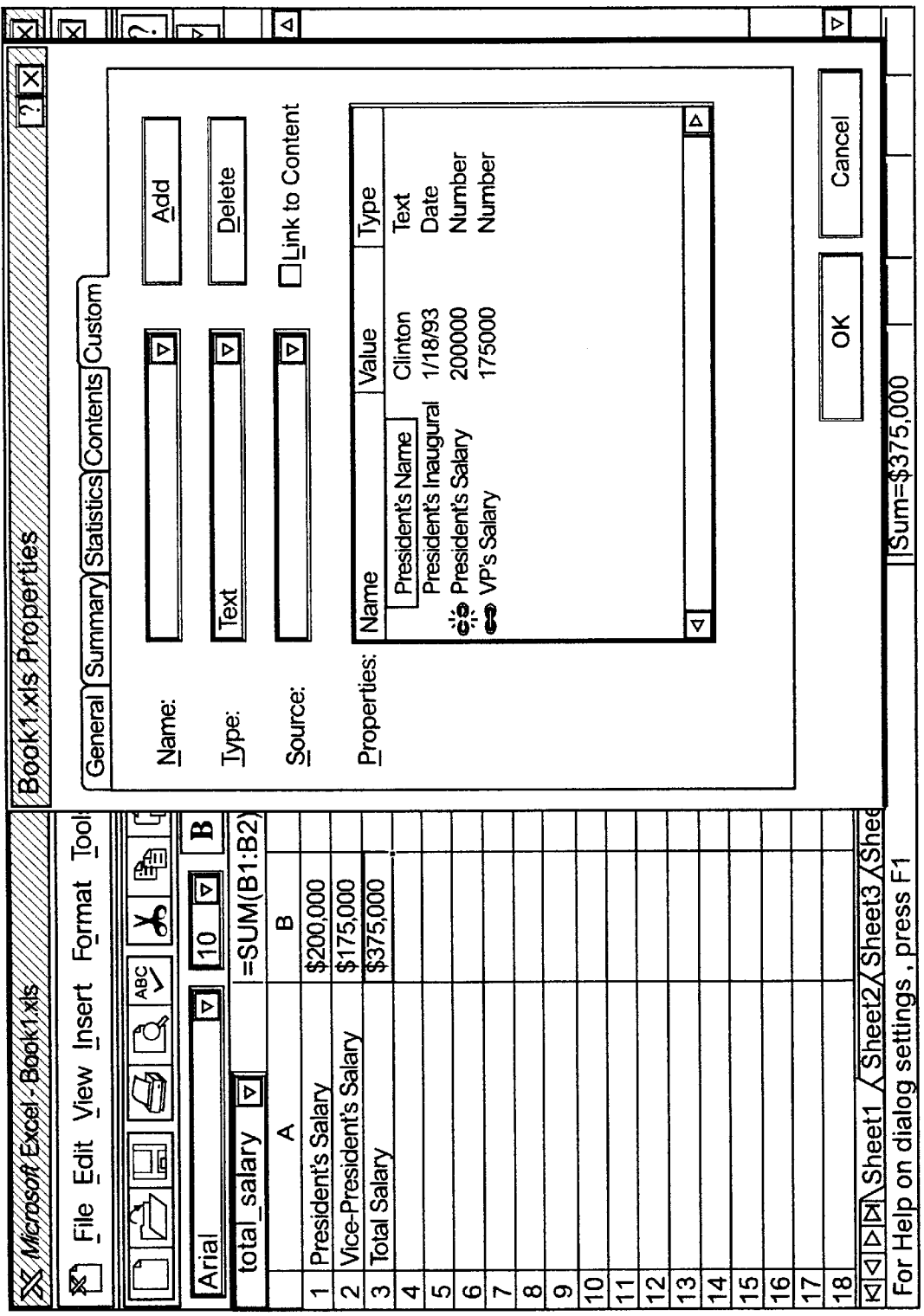

FIGS. 5A and 5B illustrate the breaking of a link. As shown in FIG. 5A, the range names no longer include the range (i.e., field) named "p_salary." That is, a user has deleted that range name, which corresponded to cell B1. Since that range name no longer exists, the link between linked property that was linked to that range name is now broken. FIG. 5B illustrates how the custom property user interface indicates the broken link. In particular, the link to the left of the property name "President's Salary" is visually indicated as being broken. Thus, although there is a user-defined property that had at one time been linked, it is no longer linked to a range within the spreadsheet.

Figure 6:
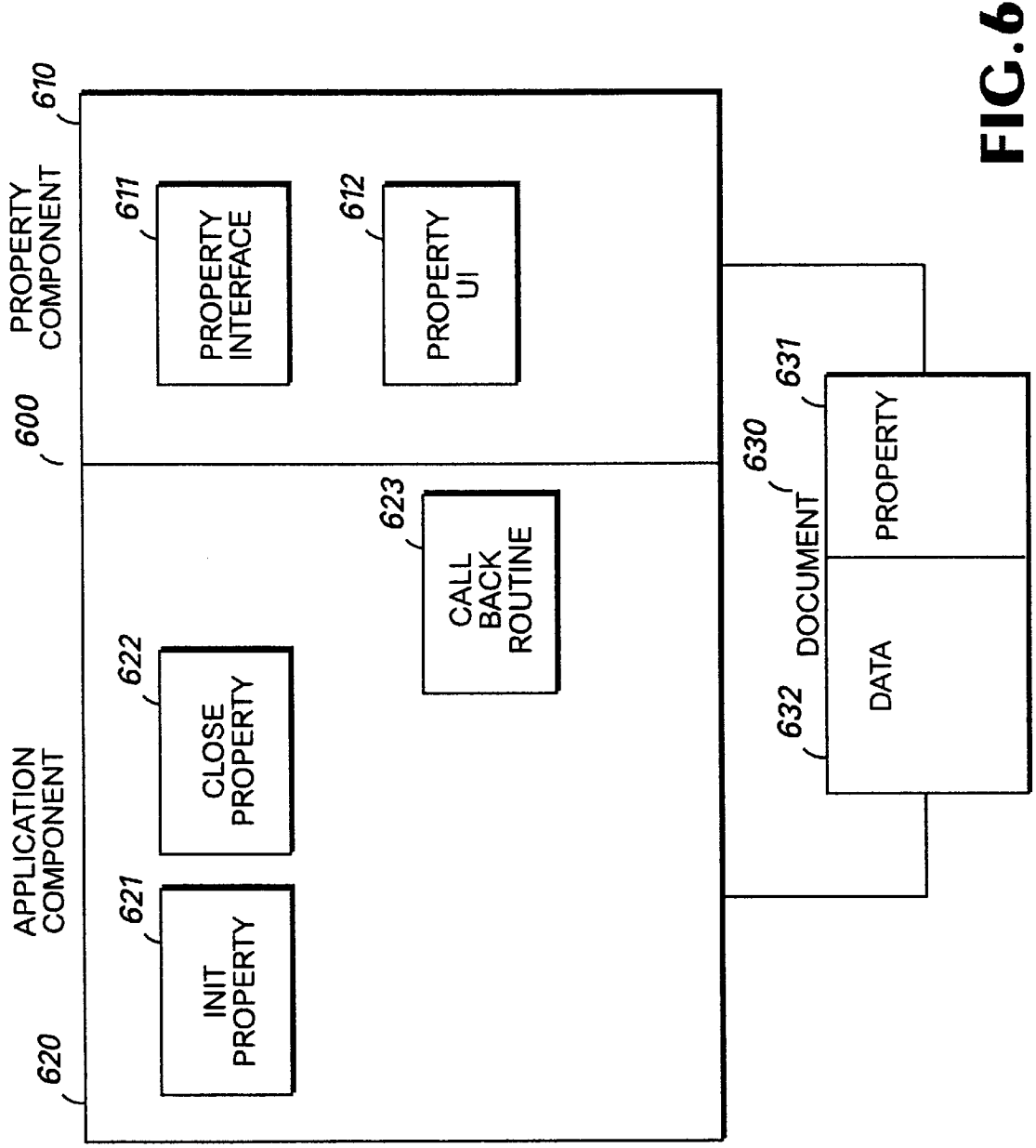
FIG. 6 is a block diagram illustrating the components of an embodiment of the present invention.

FIG. 6 is a block diagram illustrating the components of an embodiment of the present invention. The present invention is preferably implemented as a computer program that executes on a computer system. The computer system includes a central processing unit, memory, storage devices, and input and output devices. The storage devices provide a mechanism for retrieving the instructions of the computer program from a computer-readable medium. The property system 600 comprises a custom property component 610, an application component 620, and a document 630. The custom property component is preferably implemented as a dynamic link library, which is dynamically linked into an application component at runtime. The custom property component provides an application-independent interface that provides for user-defined properties and for the linking of properties. The custom property component controls the user interface for allowing a user to define custom and linked properties and controls the storing and retrieving of property information from the property stream. The custom property component comprises a custom property interface 611 and a custom property user interface 612. The custom property interface provides various functions which are called by the application component to add, delete, link, and set property values. The custom property user interface provides a user interface for allowing a user to create user-defined properties and to link properties. The application component comprises an InitProperty routine 621, a CloseProperty routine 622, and a Callback routine 623. The InitProperty routine manages the synchronizing of the linked properties that may have been updated since the last time the document was opened. The CloseProperty routine updates any linked properties whose corresponding source field value may have changed while the document was opened. The Callback routine is provided to the custom property user interface as a mechanism through which the custom property component can access the source values and types of the linked properties. The document 630 comprises a property stream 631 and a content stream 632.

The custom property interface provides various functions through which the application component can access the functionality of the custom properties. The functions allow for the application component to determine the number of properties, create and delete custom properties and linked properties, retrieve and set the value of a property, and determine the type of a property. In addition, the custom property interface provides functions that iterate through the custom properties and allow for the adding, changing, and deleting of the iterated custom properties and linked properties. Finally, the custom property interface provides a function that controls the display and processing of the custom property user interface.

Since the custom property component is application independent, the property system provides a mechanism for the custom property component to retrieve application-dependent information from the application component. The application-dependent information includes the names of the fields and the source field values/types. The mechanism is the Callback routine implemented by the application component. When the application component requests that the custom property component display the custom property user interface, the application component passes a reference to the Callback routine. The custom property component uses this Callback routine to retrieve the names, types, and values of the fields.

Figure 7:
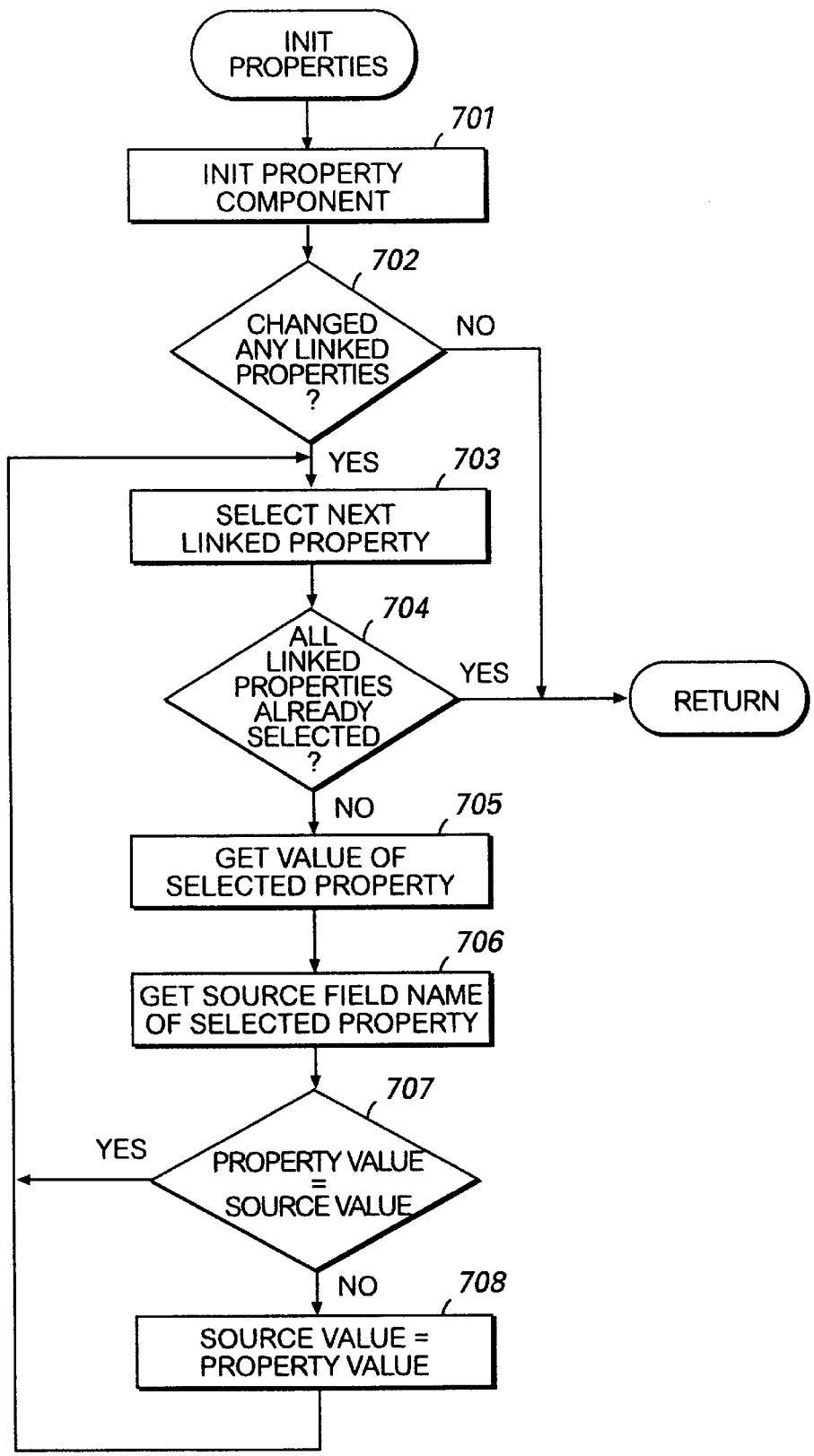
FIG. 7 is a flow diagram of the InitProperties routine of the application component.

FIG. 7 is a flow diagram of the InitProperties routine of the application component. The InitProperties routine is invoked by the application component when a document is first opened. The InitProperties routine synchronizes the linked properties with the corresponding source fields. In particular, the routine determines which linked property values are different from the corresponding source field values and sets those source field values equal to the corresponding linked property values. In step 701, the routine invokes an initialization function of the custom property interface. The initialization function accesses the data of the property stream of the opened document to retrieve the information describing the custom and linked properties. In step 702, the routine invokes a function of the custom property interface to determine whether there are any changed linked properties for the currently opened document. If there are changed linked properties, then the routine continues at step 703, else the routine returns. In steps 703–708, the routine loops selecting each linked property and synchronizing its linked property value with its corresponding source field value and type. In step 703, the routine selects the next linked property by invoking a function of the custom property interface. In step 704, if all the linked properties have already been selected, then the routine returns, else the routine continues at step 705. In step 705, the routine retrieves the linked property value of the selected linked property by invoking a function of the custom property interface. In step 706, the routine retrieves the name of the source field that is linked to the selected linked property by invoking a function of the custom property interface. In step 707, if the linked property value is equal to the corresponding source field value, then the linked property is already synchronized with the source field and the routine loops to step 703 to select the next linked property, else the routine continues at 708. In step 708, the routine sets the source field value to the linked property value to synchronize the values and loops to step 703 to select the next linked property.

Figure 8:
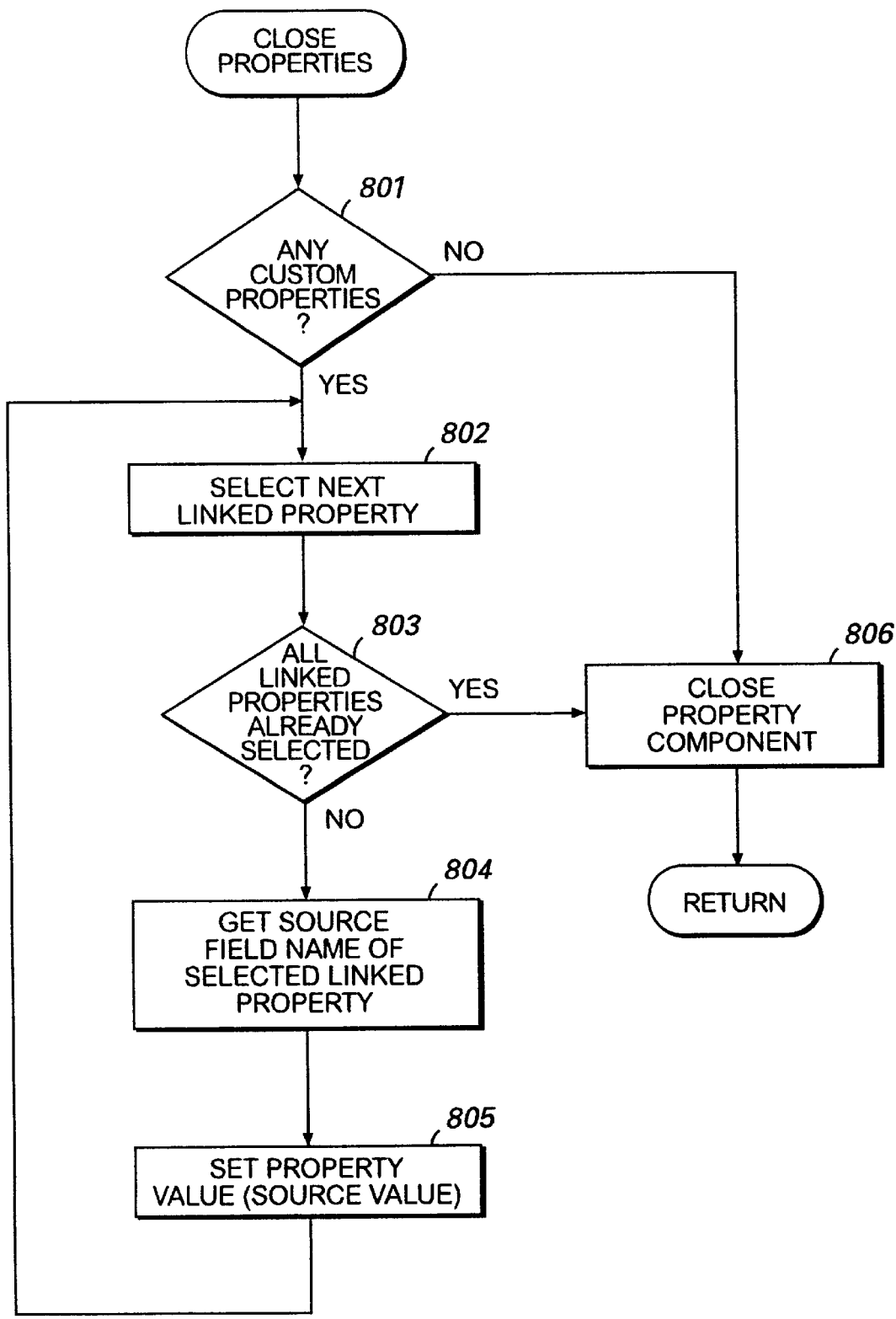
FIG. 8 is a flow diagram of the CloseProperties routine.

FIG. 8 is a flow diagram of the CloseProperties routine. The CloseProperty routine is invoked by the application component when the document is being closed. The Closed-Property routine sets any linked property values to the corresponding source field value. In step 801, the routine determines whether there are any custom properties by invoking a function of the custom property interface. If there are any custom properties that are linked, then the routine continues at step 802, else routine continues as step 806. In steps 802–805, the routine loops selecting each linked property and setting its linked property value to the corresponding source field value. In step 802, the routine selects the next linked property by invoking a function of the custom property interface. In step 803, if all the linked properties have already been selected, then the routine continues at step 806, else the routine continues as step 804. In step 804, the routine retrieves the name of the source field corresponding to the selected linked property by invoking a function of the custom property interface. In step 805, the routine sets the linked property value to the source field value by invoking a function of the custom property interface and loops to step 802 to select the next linked property. In step 806, the routine invokes a close function of the custom property interface to close the property component and the returns.

Figure 9:
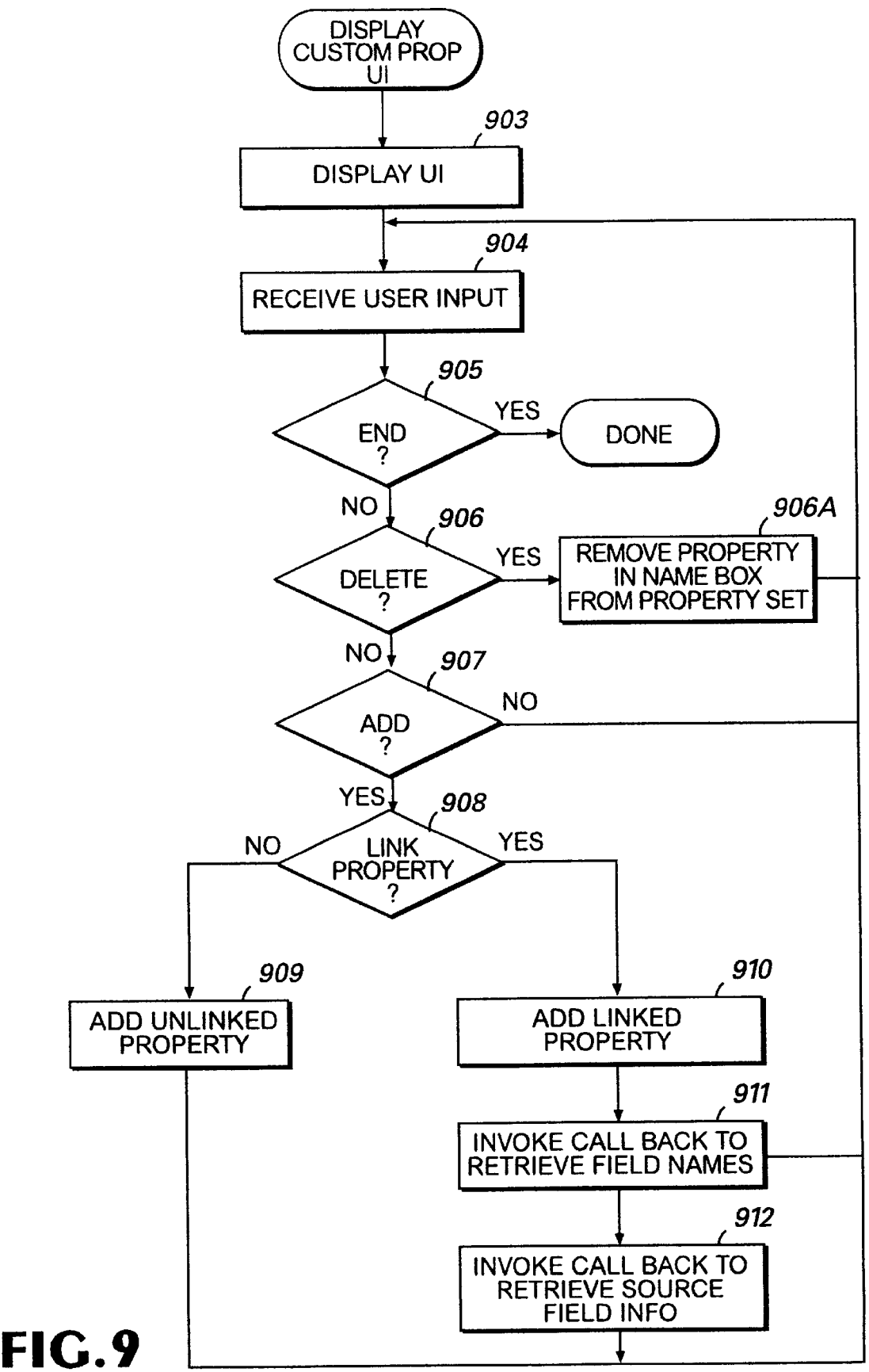
FIG. 9 is a flow diagram of a functional description of the window procedure that controls the display of the custom property user interface.

FIG. 9 is a flow diagram of a functional description of the window procedure that controls the display of the custom property user interface. One skilled in the art would appreciate that window procedures are invoked in response to asynchronous message typically resulting from user input. In step 903, the component displays the user interface. In steps 904–912, the component loop processing user input. The details of changing the user interface (e.g., when the link-to-content box is selected) are not described, since one skilled in the art could readily develop such a user interface from the description of FIGS. 2–5. In step 904, the component receives user input. In step 905, if the user input indicates that the user is ending property processing, then the custom property component removes the user interface and returns control to the application component. In step 906, if the user indicates to delete a property listed in the properties box, then the component deletes the property from the property set, updates the user interface, and processes the next user input. In steps 907–912, if the user input indicates to add a property, then either a linked or unlinked property is added based on the link-to-content box. When the custom property component adds a linked property, two properties are actually added to the property set stream. The first property defines the property itself, and the second property identifies the name of the source field to which it is linked. The two properties are given identifiers with a predefined relation to one another. For example, the property identifier of the property that identifies the source field name is the same as the property identifier of the linked property, except that its high-order bit is set. Thus, the property system can determine from the presence of this second property whether the property is linked and if so, its source field name. In steps 911 and 912, the custom property component invokes the Callback routine to retrieve information for the name in the source fields.

The Callback routine is provided by the application component and invoked by the custom property user interface so that the custom property component can retrieve the current source field value, type, and name for any linked property. The Callback routine can also be used to create a list of the names that are available to be linked to a property.

The present invention also has various other aspects. In one aspect, the properties can have various attributes. For example, a linked property can be read-only to either the application that changes the contents of the document or applications that access only the properties. The applications need to agree to conform to the read-only attribute. In another aspect, fields can be added as linked properties. For example, when a field is defined, the application component can ask the user whether a linked property should be created and linked to the field. Alternatively, a linked property can automatically be added for fields with certain names. For example, if a field name is prefixed with "Prop__," then a linked property is automatically created. In another aspect, the custom property component can notify the application component to scroll to a particular field name. In this way, the user can see the source field in the application window.

Although the present invention has been described in terms of preferred embodiments, it is not intended that the invention be limited to these embodiments. Modifications within the spirit of the invention will be apparent to those skilled in the art. The scope of the present invention is defined by the claims that follow.

We claim:

1. A computer-implemented method for providing indirect access to data in a content area of a document created with a first application, comprising the following steps:

creating a property within a properties area of the document, wherein the content area of the document is not directly accessible by a second application, and the properties area of the document is directly accessible by the second application without launching the first application; and linking the property and the data to make the data indirectly accessible to the second application without launching the first application.

2. The method of claim 1, further comprising the following steps:

receiving a change to the data while the document is open; and in response to a command to close the document, replacing a value associated with the property with the data.

3. The method of claim 1, further comprising the following step:

receiving a change to a value associated with the property while the document is closed; and in response to a command to open the document, replacing the data with the value.

4. The method of claim 1, wherein the properties area is formatted in accordance with an OLE property set model.

5. A computer-readable medium having computer-executable instructions for performing the method recited in claim 1.

6. A method for providing indirect access to data in a content area of a document created with a first application, comprising the following steps:

launching the first application;

in the first application,
opening the document to access the content area,
linking the data to a value associated with a property within a properties area of the document, and
copying the data to the value;

quitting the first application;

launching a second application that is capable of accessing the properties area of the document and is incapable of accessing the content area of the document; and after launching the second application, accessing the data by retrieving the value from the properties area without accessing the content area of the document.

7. A method for indirectly updating data in a content area of a document, comprising:

storing a value in a properties area of the document without launching an application capable of opening the document to directly access the content area of the document;

launching an application capable of opening the document to directly access the content area of the document; and in the launching application, replacing the data with the value.

8. A computer-implemented method for creating a user-defined property for a document, comprising the following steps:

receiving from a user an instruction to create a property within a properties area of the document, wherein:
the properties area of the document is directly accessible by a second application without launching a first application in which the document was created,
the document includes a content area that is not directly accessible by the second application without launching the first application, and
the properties area stores a value associated with the property that the second application can directly access without launching the first application; and creating the property per the user's instructions.

9. The method of claim 8, further comprising the following steps:

receiving from the user an instruction to link the value and data in the content area; and linking the value and the data per the user's instructions.

10. The method of claim 8, wherein the user's instruction to create the property are received through a graphical user interface presented to the user while the document is opened in the first application.

11. The method of claim 9, wherein the users instructions to create the property and to link the value and the data are received through a graphical user interface presented to the user while the document is opened in the first application.

12. The method of claim 8, wherein the properties area is formatted in accordance with an OLE property set model.

* * * * *